(12) United States Patent
Lindhorn

(10) Patent No.: US 6,619,921 B1
(45) Date of Patent: Sep. 16, 2003

(54) DRIVING VANE ASSEMBLY FOR A WINDMILL

(76) Inventor: Hank Lindhorn, 1809 Central Blvd., Brownsville, TX (US) 78520

( * ) Notice: Subject to any disclaimer, the term of this patent is extended or adjusted under 35 U.S.C. 154(b) by 0 days.

(21) Appl. No.: 10/083,535

(22) Filed: Feb. 27, 2002

(51) Int. Cl.$^7$ ................................................ F03D 3/06
(52) U.S. Cl. ...................................... 416/117; 416/140
(58) Field of Search ................................. 416/117, 140

(56) References Cited

U.S. PATENT DOCUMENTS

| | | |
|---|---|---|
| 2,153,523 A | 4/1939 | Roberts et al. |
| 2,177,801 A | 10/1939 | Erren |
| 2,237,857 A | 4/1941 | Winderl |
| 2,419,384 A | 4/1947 | Ault |
| 3,810,712 A | 5/1974 | Hillman |
| 4,039,848 A | 8/1977 | Winderl |
| 4,213,057 A | 7/1980 | Are |
| 4,619,583 A | 10/1986 | Wikstrom |
| 4,822,239 A | 4/1989 | Tsipov |
| 5,083,902 A | 1/1992 | Rhodes |
| 5,506,453 A | 4/1996 | McCombs |

*Primary Examiner*—Edward K. Look
*Assistant Examiner*—Kimya N. McCoy
(74) *Attorney, Agent, or Firm*—Birch, Stewart, Kolasch & Birch, LLP (57) ABSTRACT

A blade assembly for a windmill includes an output shaft with a first cross-shaft and a second cross-shaft operatively mounted relative to the output shaft. The first cross-shaft and the second cross-shaft include a first end and a distal end. A first blade is mounted on the first end of the first cross-shaft and the first cross-shaft is rotated by the first blade to impart rotation to the output shaft. A second blade is mounted on the distal end of the first cross-shaft and the first cross-shaft is rotated by the second blade to impart rotation to the output shaft. Stops are positioned on the first cross-shaft for limiting the rotation of the first cross-shaft relative to the output shaft. A third blade is mounted on the first end of the second cross-shaft and the second cross-shaft is rotated by the third blade to impart rotation to the output shaft. A fourth blade is mounted on the distal end of the second cross-shaft and the second cross-shaft is rotated by the fourth blade to impart rotation to the output shaft. Stop are positioned on the second cross-shaft for limiting the rotation of the second cross-shaft relative to the output shaft. In operation, the first blade, second blade, third blade and fourth blade are incrementally driven to impart a predetermined rotation to the output shaft to thereby provide continuous rotation to the output shaft.

20 Claims, 6 Drawing Sheets

DRIVING VANE ASSEMBLY FOR A WINDMILL

BACKGROUND OF THE INVENTION

1. Field of the Invention

The present invention is directed to a driving vane assembly for a windmill that provides omnidirectional rotation to an output shaft without the need for providing a device for pointing the windmill assembly into the wind.

2. Description of Background Art

Hitertofore, windmill assemblies normally required a device for pointing the vanes of the windmill into the wind. The normal windmill includes a plurality of vanes of a fan that are mounted for rotation on a derrick. This type of windmill requires the use of a rudder-like member for positioning the plurality of vanes of the fan to be directed into the wind for maximizing power output. The low rotational speed and high torque output permits this type of windmill to be used together with a reciprocating water pump for supplying water to cattle or other livestock. A disadvantage of this type of windmill is that the vanes of the fan may be damaged during high wind conditions. In view of this disadvantage, the rudder-like mechanism is usually manually pivotable so as to align the fan with the wind and thereby prevent the wind from causing the vanes of the fan to rotate. To be properly operated, the windmill must be located within easy access of an operator which is difficult in the case of a remote location.

A class of windmills does exist that do not require the use of a directional rudder or control mechanism. Generally, this type of windmill includes vanes that are spaced about a vertical axis at right angles to each other and are coupled to each other flipping up and down as the vanes rotate in a horizontal orbit. Stops are normally provided for limiting the rotation of the vanes to a particular 90 degree oscillation.

Other types of windmills are known that employ the use of a rudder that is movable by the direction of the wind to position components for regulating the speed of the windmill. In addition, springs may be used to prevent the possible breaking or warping of the vanes in a high wind. The springs are sufficiently strong to resist ordinary wind pressure for holding the vanes in a vertical direction while yielding under excessive pressure to permit the vertical vanes to flatten out rearwardly or with the wind.

SUMMARY AND OBJECTS OF THE INVENTION

It is an object of the present invention to provide an omnidirectional windmill with a blade assembly for providing rotation to an output shaft.

Another object of the present invention is to provide an omnidirectional windmill wherein a first cross-shaft and a second cross-shaft are mounted relative to each other to enable a plurality of blades to be properly oriented relative to a flow of vapor, gas or liquid for imparting movement to selective blades and thereby providing rotation to an output shaft.

A further object of the present invention is to provide stops on the first cross-shaft and the second cross-shaft wherein rotation of each of the first cross-shaft and the second-cross shaft is selectively limited for enabling selective working blades to be properly oriented relative to a flow of vapor, gas or liquid for imparting movement to selective blades and thereby providing rotation to an output shaft while permitting selective return stroke blades to be held in a horizontal or feathering position.

Another object of the present invention is to provide a rotating shaft connector for enabling a first cross-shaft and a second cross-shaft to be mounted substantially orthogonally relative to each other while enabling the stops on the first cross-shaft and the second cross-shaft to rotate a predetermine amount relative to the output shaft.

These and other objects of the invention are achieved by providing a blade assembly for a windmill that includes an output shaft with a first cross-shaft operatively mounted relative to the output shaft. The first cross-shaft includes a first end and a distal end. A second cross-shaft is operatively mounted relative to the output shaft, the second cross-shaft includes a first end and a distal end. A first blade is mounted on the first end of the first cross-shaft and the first cross-shaft is rotated by the first blade to impart rotation to the output shaft. A stop is positioned on the first cross-shaft for limiting the rotation of the first cross-shaft relative to the output shaft. A second blade is mounted on the distal end of the first cross-shaft and the first cross-shaft is rotated by the second blade to impart rotation to the output shaft. A stop is positioned on the first cross-shaft for limiting the rotation of the first cross-shaft relative to the output shaft. A third blade is mounted on the first end of the second cross-shaft and the second cross-shaft is rotated by the third blade to impart rotation to the output shaft. A stop is positioned on the second cross-shaft for limiting the rotation of the second cross-shaft relative to the output shaft. A fourth blade is mounted on the distal end of the second cross-shaft and the second cross-shaft is rotated by the fourth blade to impart rotation to the output shaft. A stop is positioned on the second cross-shaft for limiting the rotation of the second cross-shaft relative to the output shaft. In operation the first blade is driven to impart a predetermined rotation to the output shaft and thereafter the third blade is driven to impart a predetermined rotation to the output shaft and thereafter the second blade is driven to impart a predetermined rotation to the output shaft and thereafter the fourth blade is driven to impart a predetermined rotation to the output shaft for providing continuous rotation to the output shaft.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
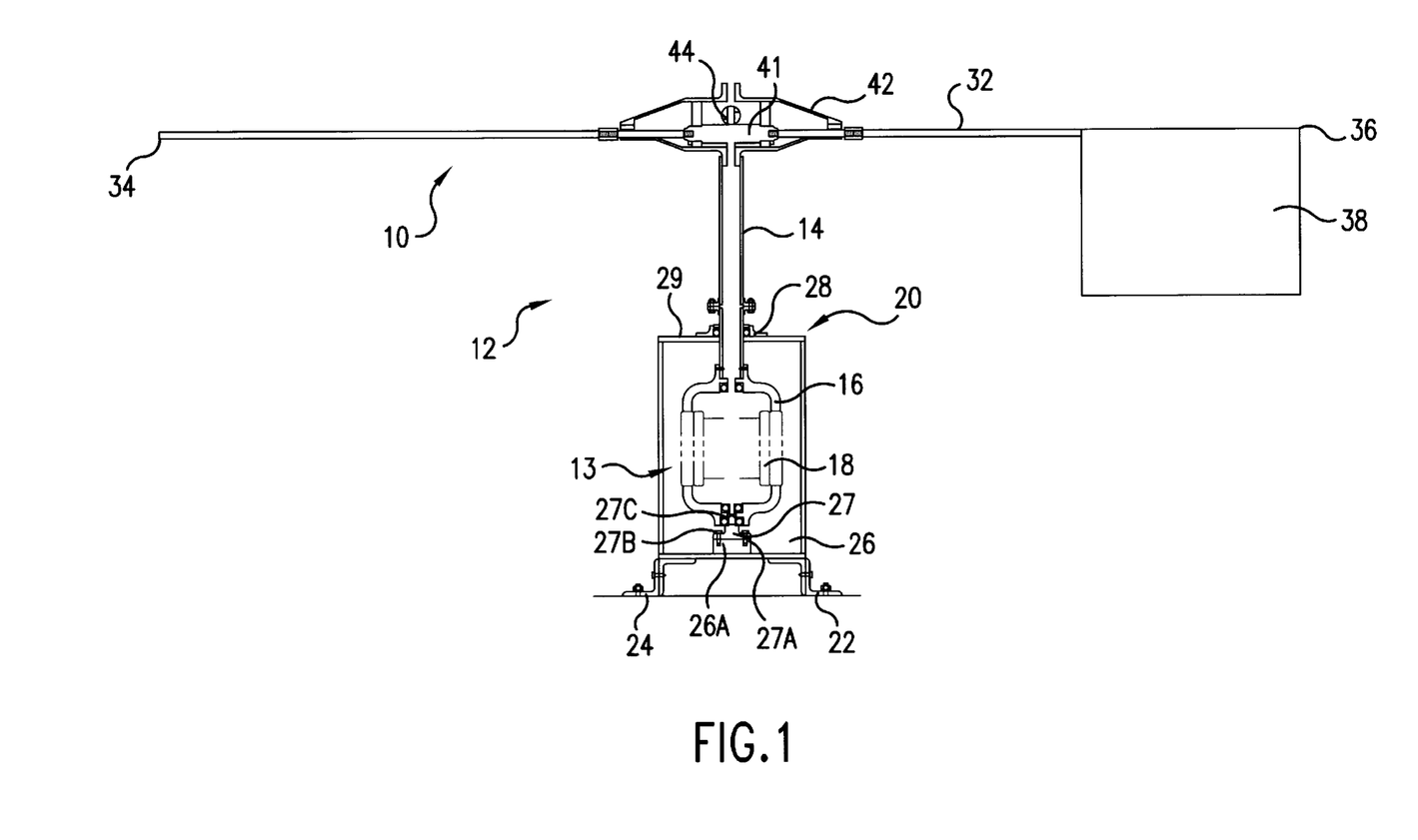
FIG. 1 is a cross-sectional view illustrating a windmill assembly with one set of vanes for providing rotation to a single output shaft member.

As illustrated in FIG. 1, a blade assembly 10 is provided for a windmill 12. The windmill 12 includes a single output shaft 14 that is mounted in a substantially vertical direction. The output shaft 14 is operatively connected to a generator 13 for turning an armature winding 16 of the generator 13 relative to a field magnet 18. The generator 13 is mounted within a housing 20 that is secured to a support surface by flanges 22, 24. The housing 20 includes a lower wall 26 with a mounting bracket 26A secured to an upper surface thereof A bearing fitting 27 is secured to the mounting bracket 26A by means of bolts 27A and 27B. The bearing fitting 27 includes a bearing 27C for mounting the armature winding 16 for rotation relative to the bearing fitting 27. In addition, a fitting 28 is secured to an upper surface 29 of the housing 20 for rotatably mounting the output shaft 14 relative to the housing 20.

The blade assembly includes a first cross-shaft 32 operatively mounted relative to said output shaft 14. The first cross-shaft 32 including a first end 34 and a distal end 36. A second cross-shaft, not illustrated in FIG. 1, extends substantially orthogonal to the first cross-shaft 32 and is operatively mounted relative to the output shaft 14. The second cross-shaft includes a first end and a distal end, not shown in FIG. 1.

A first blade, not shown in FIG. 1, is mounted on the first end of said first cross-shaft 32. The first cross-shaft is selectively rotated by the first blade to impart rotation to the output shaft 14. A stop, not shown in FIG. 1, is positioned on the first cross-shaft for limiting the rotation of the first cross-shaft relative to the output shaft 14. A second blade 38 is mounted on the distal end 36 of the first cross-shaft 32. The first cross-shaft 32 is selectively rotated by the second blade 38 to impart rotation to the output shaft 14. A stop, not shown in FIG. 1, is positioned on the first cross-shaft 32 for limiting the rotation of the first cross-shaft 32 relative to the output shaft 14.

FIG. 1 is a cross-sectional view that does not illustrate a third blade that is mounted on a first end of the second cross-shaft. The second cross-shaft is rotated by the third blade to impart rotation to the outer shaft 14. A stop, not illustrated in FIG. 1, is positioned on the second cross-shaft for limiting the rotation of the second cross-shaft relative to the output shaft 14. In addition, a fourth blade, not illustrated in FIG. 1, is mounted on a distal end of the second cross-shaft. The second cross-shaft is rotated by the fourth blade to impart rotation to the output shaft 14. A stop, not illustrated in FIG. 1, is positioned on the second cross-shaft for limiting the rotation of the second cross-shaft relative to the output shaft 14.

A first rotating shaft connector 41 is positioned within the cover housing 42. The first rotating shaft connector 41 secures the central portion of the first cross-shaft 32. A second rotating shaft connector. 44 is positioned within the cover housing 42. The second rotating shaft connector 44 is disposed to be substantially orthogonally arranged relative to the first rotating shaft connector 41. The second rotating shaft connector 44 secures the central portion of the second cross-shaft.

As the wind or other fluid stream engages the first blade of the windmill 12, the first blade is driven to impart a predetermined rotation to the output shaft 14 while the second blade 38 is held in a substantially horizontal or feathering position. Thereafter, the third blade is driven to impart a predetermined rotation to the output shaft 14 while the fourth blade is held in a substantially horizontal or feathering position. Thereafter, the second blade 38 is drive to impart a predetermined rotation to the output shaft 14 while the first blade is held in a substantially horizontal or feathering position. Finally, the fourth blade is driven to impart a predetermined rotation to said output shaft while the third blade is held in a substantially horizontal or feathering position. By continuously switching from the first blade to the third blade to the second blade 38 to the fourth blade a continuous rotation is provided to the output shaft 14.

As illustrated in FIGS. 2–8, a second embodiment of utilizing two blade assemblies 1000A and 1000B are provided for a windmill 112. The windmill 112 includes two output shafts 114A and 114B that are mounted in a substantially vertical direction. The output shaft 114A is operatively connected to a generator 113 for turning an armature winding 116 of the generator 113. The output shaft 114B is operatively connected for turning a field magnet 118 in the opposite. The generator 113 is mounted within a housing 120 that is secured to a support surface.

Figure 2:
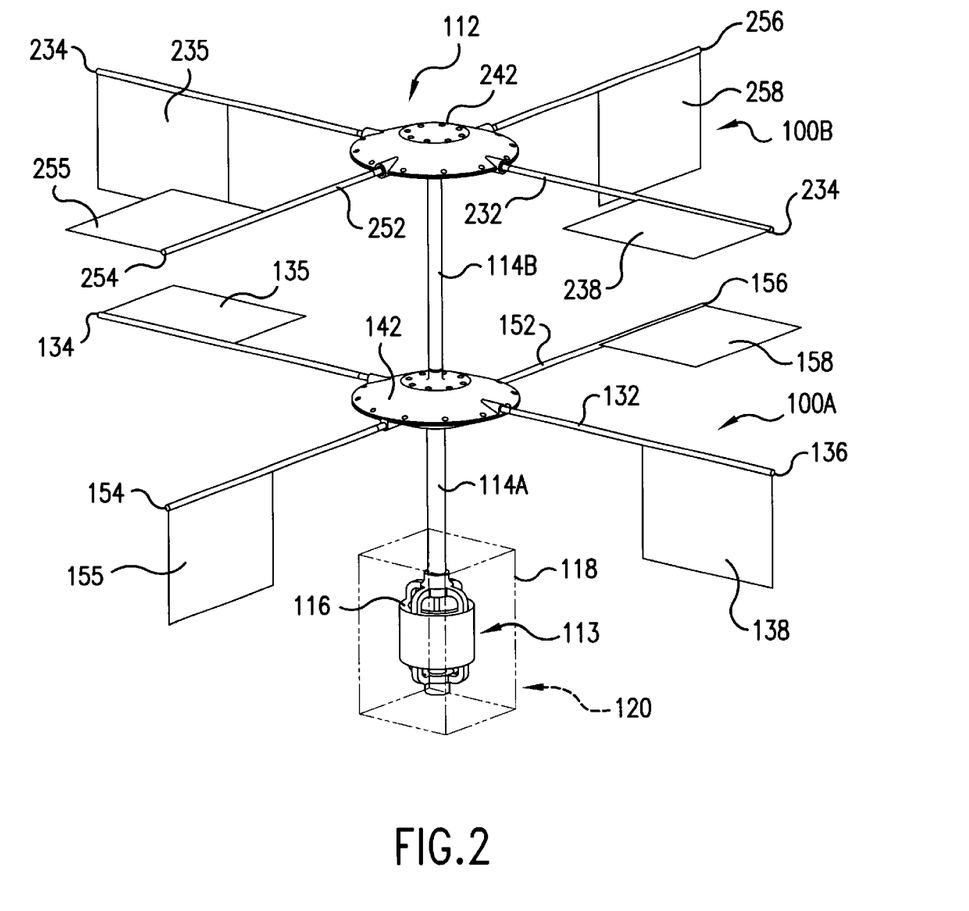
FIG. 2 is a perspective view illustrating a windmill assembly with two sets of vanes for providing rotation to two coaxially aligned shaft members.

The blade assembly 100A includes a first cross-shaft 132 operatively mounted relative to said output shaft 114A. The first cross-shaft 132 including a first end 134 and a distal end 136. A second cross-shaft 152 extends substantially orthogonal to the first cross-shaft 132 and is operatively mounted relative to the output shaft 114A. The second cross-shaft includes a first end 154 and a distal end 156.

Figure 7:
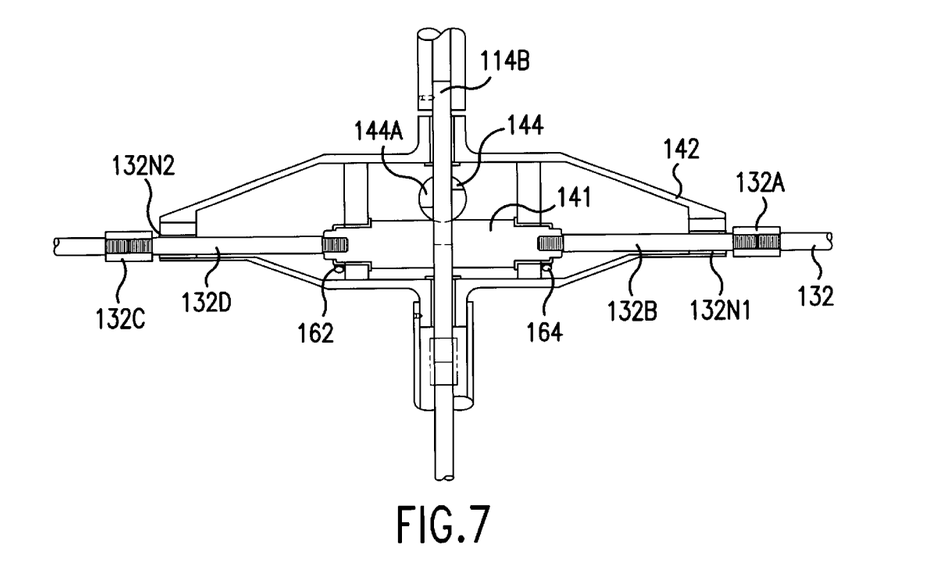
FIG. 7 is a cross-sectional view of the lower joint assembly.

A first blade 135 is mounted on the first end 134 of said first cross-shaft 132. The first cross-shaft 132 is selectively rotated by the first blade 135 to impart rotation to the output shaft 114A. As illustrated in FIG. 7, a first stop 162 is secured to one side of the first cross-shaft 132 for limiting the rotation of the first cross-shaft 132 relative to the output shaft 114B. A second blade 138 is mounted on the distal end 136 of the first cross-shaft 132. The first cross-shaft 132 is selectively rotated by the second blade 138 to impart rotation to the output shaft 114A. As illustrated in FIG. 7, a second stop 164 is positioned on the first cross-shaft 132 for limiting the rotation of the first cross-shaft 132 relative to the output shaft 114B.

Figure 6:
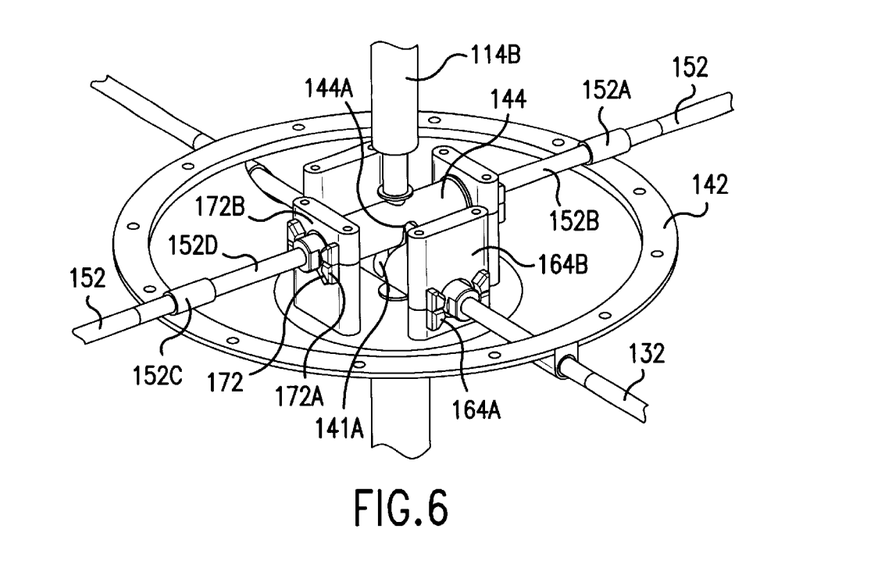
FIG. 6 is an isometric view of the lower joint assembly with the cover removed for clarity.

A third blade 155 is mounted on a first end 154 of the second cross-shaft 152. The second cross-shaft 152 is rotated by the third blade 155 to impart rotation to the output shaft 114A. As illustrated in FIG. 6, a stop 172 is positioned on the second cross-shaft 152 for limiting the rotation of the second cross-shaft 152 relative to the output shaft 114A. In addition, a fourth blade 158 is mounted on a distal end 156 of the second cross-shaft 152. The second cross-shaft 152 is rotated by the fourth blade 158 to impart rotation to the output shaft 114A. A stop, not illustrated in FIG. 2, is positioned on the second cross-shaft 152 for limiting the rotation of the second cross-shaft 152 relative to the output shaft 114A.

As the wind or other fluid stream engages the first blade of the windmill 112, the first blade 135 is driven to impart a predetermined rotation to the output shaft 114A while the second blade 138 is held in a substantially horizontal or feathering position. Thereafter, the third blade 155 is driven to impart a predetermined rotation to the output shaft 114A while the fourth blade 158 is held in a substantially horizontal or feathering position. Thereafter, the second blade 138 is driven to impart a predetermined rotation to the output shaft 114A while the first blade 135 is held in a substantially horizontal or feathering position. Finally, the fourth blade 158 is driven to impart a predetermined rotation to said output shaft 114A while the third blade 155 is held in a substantially horizontal or feathering position. By continuously switching from the first blade 135 to the third blade 155 to the second blade 138 to the fourth blade 158 a continuous rotation is provided to the output shaft 114A.

As illustrated in FIGS. 6 and 7, a first rotating shaft connector 141 is positioned within the cover housing 142. The first rotating shaft connector 141 secures the central portion of the first cross-shaft 132. A coupling 132A secures the outer portion of the first cross-shaft 132 relative to an inner portion 132B of the first cross-shaft 132. A needle bearing 132N1 is provided for supporting the first cross-shaft 132 relative to the cover housing 142. The stop 164, as illustrated in FIG. 7, is adapted to engage a stop surface 164A positioned on the support housing 164B, as illustrated in FIG. 6. The first rotating shaft connector 141 includes an opening 141A that extends across the first rotating shaft connector 141 for enabling the second output shaft 114B to extend therethrough. A coupling 132C secures another portion of the second cross-shaft 132 relative to an inner portion 132D. A needle bearing 132N2 is provided for supporting the portion of second cross-shaft 132 that is disposed adjacent to the coupling 132C relative to the cover housing 142.

Similarly, as illustrated in FIGS. 6 and 7, a second rotating shaft connector 144 is positioned within the cover housing 142. The second rotating shaft connector 144 secures the central portion of the second cross-shaft 152. A coupling 152A secures the outer portion of the second cross-shaft 152 relative to an inner portion 152B of the second cross-shaft 152. A needle bearing is provided for supporting the second cross-shaft 152 relative to the cover housing 142. The stop 172, as illustrated in FIG. 6, is adapted to engage a stop surface 172A positioned on the support housing 172B. The second rotating shaft connector 144 includes an opening 144A that extends across the second rotating shaft connector 144 for enabling the second output shaft 114B to extend therethrough. A coupling 152C secures another portion of the second cross-shaft 152 relative to an inner portion 152D. A needle bearing is provided for supporting the portion of second cross-shaft 152 that is disposed adjacent to the coupling 152C relative to the cover housing 142.

The blade assembly 100B includes a third cross-shaft 232 operatively mounted relative to said second output shaft 114B. The third cross-shaft 232 including a first end 234 and a distal end 236. A fourth cross-shaft 252 extends substantially orthogonal to the third cross-shaft 232 and is operatively mounted relative to the second output shaft 114B. The fourth cross-shaft includes a first end 254 and a distal end 256.

Figure 4:
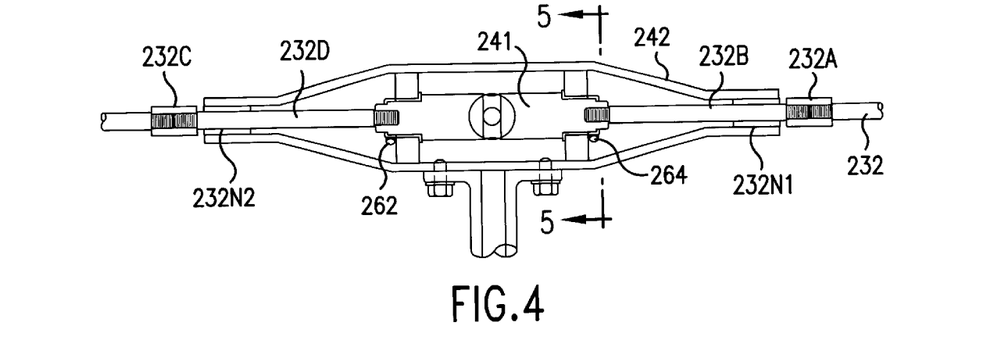
FIG. 4 is a cross-sectional view of the upper joint assembly.

A fifth blade 235 is mounted on the first end 234 of said third cross-shaft 232. The third cross-shaft 232 is selectively rotated by the fifth blade 235 to impart rotation to the second output shaft 114B. As illustrated in FIG. 4, a first stop 262 is secured to one side of the third cross-shaft 232 for limiting the rotation of the third cross-shaft 232 relative to the second output shaft 114B. A sixth blade 238 is mounted on the distal end 236 of the third cross-shaft 232. The third cross-shaft 232 is selectively rotated by the sixth blade 238 to impart rotation to the second output shaft 114B. As illustrated in FIG. 4, a second stop 264 is positioned on the third cross-shaft 232 for limiting the rotation of the third cross-shaft 232 relative to the second output shaft 114B.

Figure 3:
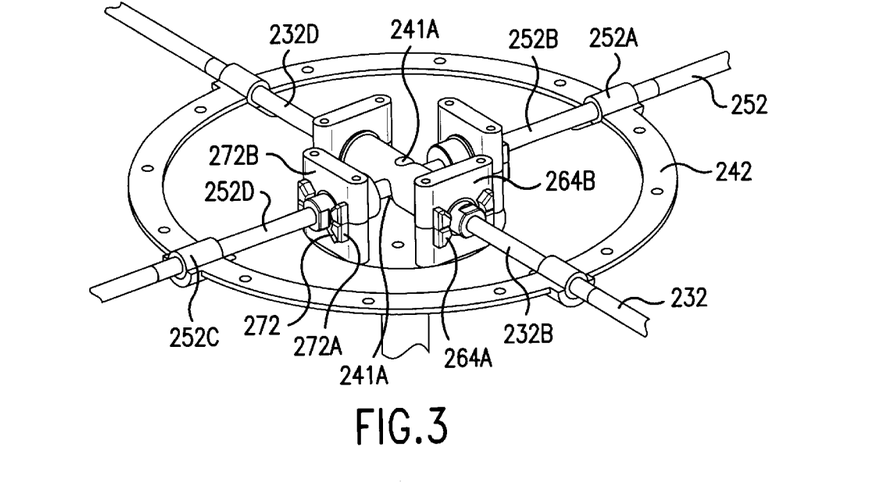
FIG. 3 is an isometric view of the upper joint assembly with the top cover removed.

A seventh blade 255 is mounted on a first end 254 of the fourth cross-shaft 252. The fourth cross-shaft 252 is rotated by the seventh blade 255 to impart rotation to the second output shaft 114B. As illustrated in FIG. 3, a stop 272 is positioned on the fourth cross-shaft 252 for limiting the rotation of the fourth cross-shaft 252 relative to the second output shaft 114B. In addition, an eight blade 258 is mounted on a distal end 256 of the fourth cross-shaft 252. The fourth cross-shaft 252 is rotated by the fourth blade 258 to impart rotation to the second output shaft 114B. A stop, not illustrated in FIG. 3, is positioned on the fourth cross-shaft 252 for limiting the rotation of the fourth cross-shaft 252 relative to the second output shaft 114B.

As the wind or other fluid stream engages the first blade of the windmill 112, the fifth blade 235 is driven to impart a predetermined rotation to the second output shaft 114B while the sixth blade 238 is held in a substantially horizontal or feathering position. Thereafter, the seventh blade 255 is driven to impart a predetermined rotation to the second output shaft 114B while the eight blade 258 is held in a substantially horizontal or feathering position. Thereafter, the sixth blade 238 is drive to impart a predetermined rotation to the second output shaft 114B while the fifth blade 235 is held in a substantially horizontal or feathering position. Finally, the eight blade 258 is driven to impart a predetermined rotation to said second output shaft 114B while the seventh blade 255 is held in a substantially horizontal or feathering position. By continuously switching from the fifth blade 235 to the seventh blade 255 to the sixth blade 238 to the eight blade 258 a continuous rotation is provided to the second output shaft 114B.

As illustrated in FIGS. 3 and 4, a third rotating shaft connector 241 is positioned within the cover housing 242. The third rotating shaft connector 241 secures the central portion of the third cross-shaft 232. A coupling 232A secures the outer portion of the third cross-shaft 232 relative to an inner portion 232B of the third cross-shaft 232. A needle bearing 232N1 is provided for supporting the third cross-shaft 232 relative to the cover housing 242. The stop 264, as illustrated in FIG. 4, is adapted to engage a stop surface 264A positioned on the support housing 264B, as illustrated in FIG. 3. The third rotating shaft connector 241 includes an opening 241A that extends across the third rotating shaft connector 241 for enabling the fourth cross-shaft 252 to extend therethrough. A coupling 232C secures another portion of the fourth cross-shaft 232 relative to an inner portion 232D. A needle bearing 232N2 is provided for supporting the portion of third cross-shaft 232 that is disposed adjacent to the coupling 232C relative to the cover housing 242.

As illustrated in FIGS. 3 and 4, the fourth cross-shaft 252 is positioned within the cover housing 242. The fourth cross-shaft 252 extends through the third rotating shaft connector 241. A coupling 252A secures the outer portion of the fourth cross-shaft 252 relative to an inner portion 252B of the fourth cross-shaft 252. A needle bearing is provided for supporting the fourth cross-shaft 252 relative to the cover housing 242. The stop 272, as illustrated in FIG. 3, is adapted to engage a stop surface 272A positioned on the support housing 272B. The third rotating shaft connector 241 includes an opening 241A that extends across the third rotating shaft connector 241 for enabling the fourth cross-shaft 252 to extend therethrough. A coupling 252C secures another portion of the fourth cross-shaft 252 relative to an inner portion 252D. A needle bearing is provided for supporting the portion of fourth cross-shaft 252 that is disposed adjacent to the coupling 252C relative to the cover housing 242.

As the wind or other fluid stream engages the first blade of the windmill 112, the fifth 235 is driven by to impart a predetermined rotation to the second output shaft 114B while the sixth blade 238 is held in a substantially horizontal or feathering position. Thereafter, the seventh blade 255 is driven to impart a predetermined rotation to the second output shaft 114B while the eight blade 258 is held in a substantially horizontal or feathering position. Thereafter, the sixth blade 238 is drive to impart a predetermined rotation to the second output shaft 114B while the fifth blade 235 is held in a substantially horizontal or feathering position. Finally, the eight blade 258 is driven to impart a predetermined rotation to said second output shaft 114B while the seventh blade 255 is held in a substantially horizontal or feathering position. By continuously switching from the fifth blade 235 to the seventh blade 255 to the sixth blade 238 to the eight blade 258 a continuous rotation is provided to the second output shaft 114B.

Figure 5:
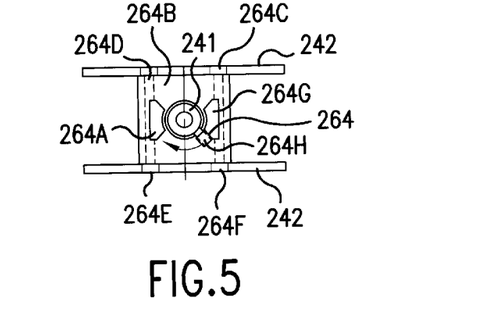
FIG. 5 is sectional view taken along line 5—5 in FIG. 4.

FIG. 5 illustrates a sectional view taken along line 5—5 in FIG. 4. The support housing 264B is positioned and secured to the cover 242 by means of bolts 264C, 264D, 264E and 264F. A stop surface 264A is disposed on one side of the support housing 264B and a second stop surface 264G is disposed on the other side of the support housing 264B. The stop 264 is mounted on the third rotating shaft 241 for limiting the rotation of the third rotating shaft 241 to a rotation of 90° by limiting the rubber member 264H mounted on the stop 264 to rotate between the stop surface 264A and the second stop surface 264G.

Figure 8:
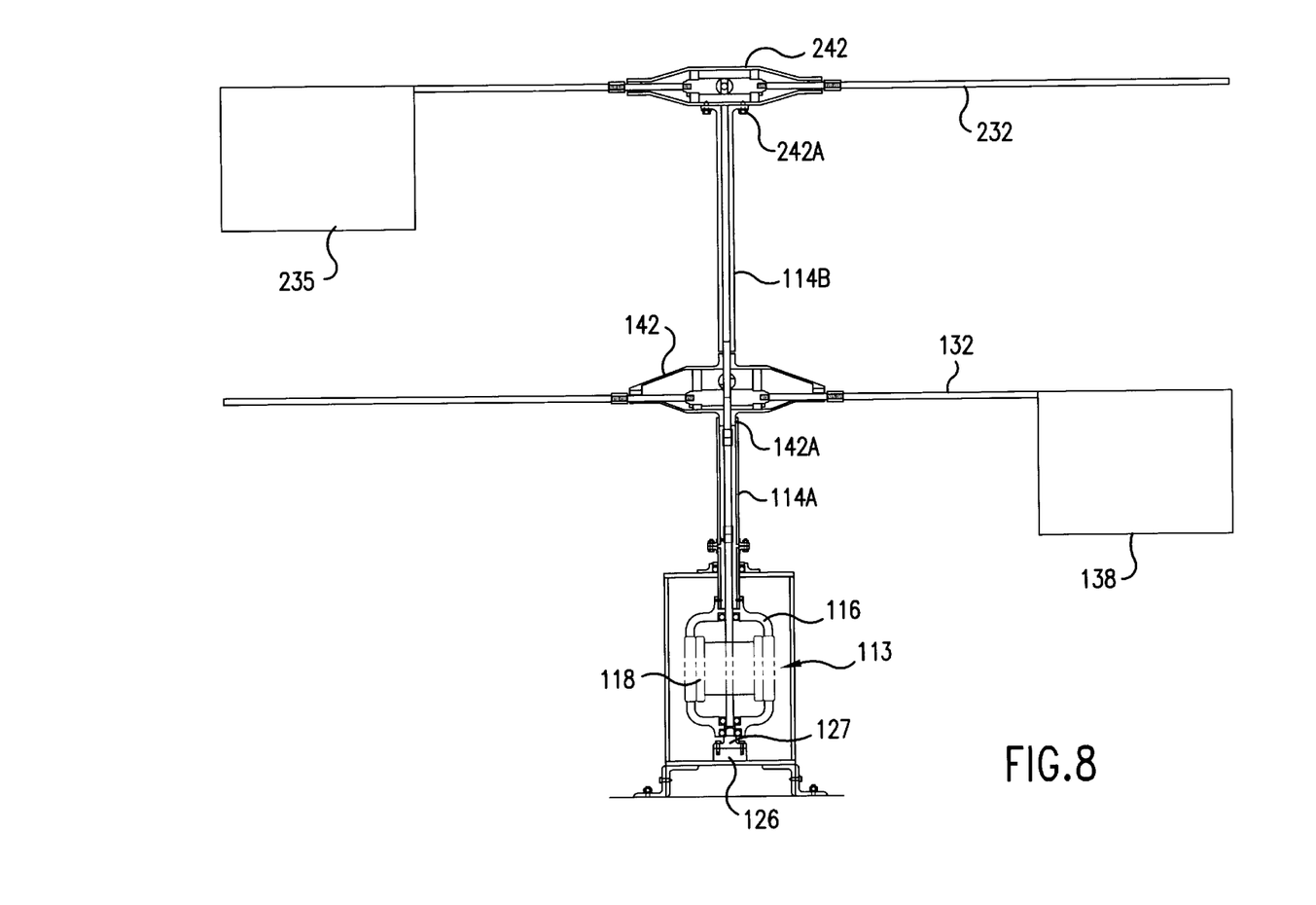
FIG. 8 is a sectional view illustrating the inner and outer shafts of the windmill assembly according to the present invention.

FIG. 8 is a sectional view illustrating the positioning of the output shaft 114A which is secured to the cover housing 142 at the connection 142A. Similarly, the output shaft 114B is secured to the cover housing 242 at the connection 242A.

As the second blade 138 is rotated in a first direction by the wind or other fluid stream, the first cross-shaft 132 is rotated together with the second blade 138 for imparting rotation to the cover housing 142 and thus rotating the output shaft 114A in a first direction. The output shaft 114A is connected to a field magnet 118 of a generator 113 for imparting rotation to the field magnet 118 in a first direction.

As the fifth blade 235 is rotated in a direction by the wind or other fluid stream which is opposite to the direction of rotation of the second blade 138, the third cross-shaft 232 is rotated together with the fifth blade 235 for imparting rotation to the cover housing 242 and thus rotating the output shaft 114B in a counter direction as compared to the first direction. The output shaft 114B is connected to a field magnet 118 for imparting rotation to the armature windings 116 of the generator 113 for rotation in the counter direction.

The generator 113 is mounted on a bearing fitting 127 that is secured to a lower wall 126 of the housing. As the field magnet 118 is rotated in a first direction by the output shaft 114A, the armature windings 116 are rotated in a counter direction by the output shaft 114B for increasing the output of the generator 113. A locking mechanism is disposed on said first output shaft to permit rotation in a first direction and to prevent rotation in a counter direction. Similarly, a locking mechanism is disposed on said second output shaft to permit rotation in a counter direction and to prevent rotation in a first direction.

Figure 9:
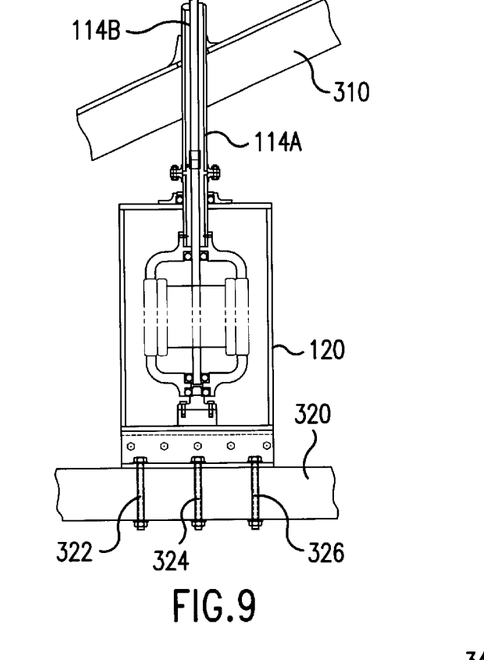
FIG. 9 is a sectional view illustrating a proposed mounting of the windmill inside a roof structure.
Figure 10:
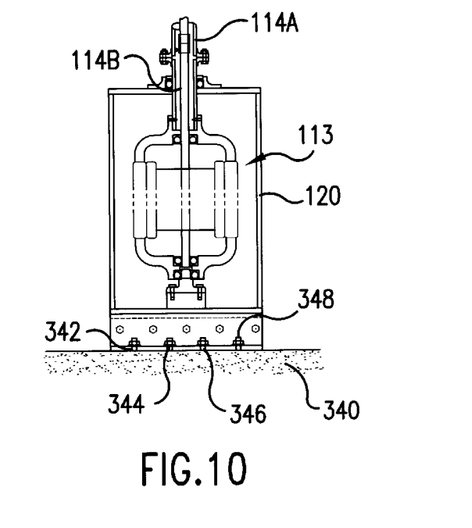
FIG. 10 is a sectional view illustrating a proposed mounting of the windmill relative to a concrete support.
Figure 11:
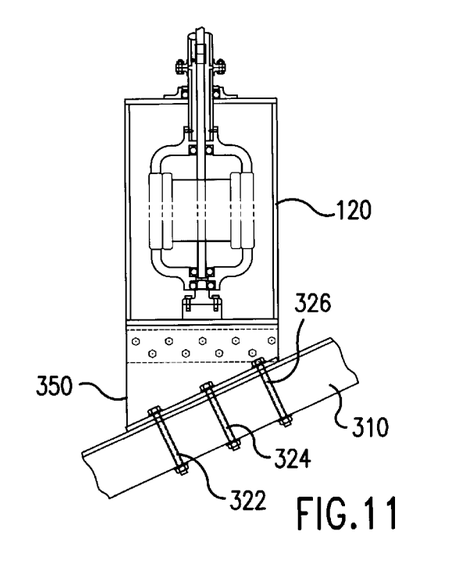
FIG. 11 is a sectional view illustrating a proposed mounting of the windmill relative to an inclined roof.

FIGS. 9–11 illustrate various ways of mounting the windmill on a support surface. As illustrated in FIG. 9, the housing 120 may be secured to roof rafters 320 by bolts 322, 324 and 326 for permitting the output shaft 114A and the output shaft 114B to project outwardly from the roof 310. In this way, the wind may impart rotation to the blades for rotating the output shaft 114A and the output shaft 114B while the housing 120 is protected within an attic.

As illustrated in FIG. 10, the housing 120 may be secured to a concrete surface 340 by bolts 342, 344, 346 and 348 for permitting the output shaft 114A and the output shaft 114B to project upwardly from the housing 120. In this way, the wind may impart rotation to the blades for rotating the output shaft 114A and the output shaft 114B while the housing 120 serves to protect the generator 113.

As illustrated in FIG. 11, the housing 120 may be secured on a roof surface using a base plate 350 that is secured to the roof surface 310 by bolts 322, 324 The output shaft 114A and the output shaft 114B project upwardly from the face 310. In this way, the wind may impart rotation to the blades for rotating the output shaft 114A and the output shaft 114B while the housing 120 serves to the generator 113.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A blade assembly for a windmill comprising:
an output shaft;
a first cross-shaft operatively mounted relative to said output shaft, said first cross-shaft including a first end and a distal end;
a second cross-shaft operatively mounted relative to said output shaft, said second cross-shaft including a first end and a distal end;
a first blade being mounted on said first end of said first cross-shaft, said first cross-shaft being rotated by said first blade to impart rotation to said output shaft, a first stop being positioned on said first cross-shaft for limiting the rotation of said first cross-shaft relative to said output shaft;
a second blade being mounted on said distal end of said first cross-shaft, said first cross-shaft being rotated by said second blade to impart rotation to said output shaft, a second stop being positioned on said first cross-shaft for limiting the rotation of said first cross-shaft relative to said output shaft;
a third blade being mounted on said first end of said second cross-shaft, said second cross-shaft being rotated by said third blade to impart rotation to said output shaft, a third stop being positioned on said second cross-shaft for limiting the rotation of said second cross-shaft relative to said output shaft; and
a fourth blade being mounted on said distal end of said second cross-shaft, said second cross-shaft being rotated by said fourth blade to impart rotation to said output shaft, a fourth stop being positioned on said second cross-shaft for limiting the rotation of said second cross-shaft relative to said output shaft;

wherein said first blade is driven to impart a predetermined rotation to said output shaft and thereafter said third blade is driven to impart a predetermined rotation to said output shaft and thereafter said second blade is drive to impart a predetermined rotation to said output shaft and thereafter said fourth blade is driven to impart a predetermined rotation to said output shaft for providing continuous rotation to the output shaft.

2. The blade assembly for a windmill according to claim 1, wherein said first blade is disposed to be driven by wind when said second blade is rotated to be out of engagement with the wind and said third blade and said fourth blade are arranged to be out of engagement with the wind.

3. The blade assembly for a windmill according to claim 1, wherein said third blade is disposed to be driven by wind when said fourth blade is rotated to be out of engagement with the wind and said first blade and said second blade are arranged to be out of engagement with the wind.

4. The blade assembly for a windmill according to claim 1, wherein said second blade is disposed to be driven by wind when said first blade is rotated to be out of engagement with the wind and said third blade and said fourth blade are arranged to be out of engagement with the wind.

5. The blade assembly for a windmill according to claim 1, wherein said fourth blade is disposed to be driven by wind when said third blade is rotated to be out of engagement with the wind and said first blade and said second blade are arranged to be out of engagement with the wind.

6. The blade assembly for a windmill according to claim 1, wherein said output shaft is locked to permit rotation in a first direction and to prevent rotation in a reverse direction.

7. The blade assembly for a windmill according to claim 1, wherein a distal end of said output shaft is operatively connected to a generator for generating electricity.

8. The blade assembly for a windmill according to claim 1, wherein said first stop and second stop positioned on said first cross-shaft and said third stop and fourth stop positioned on said second cross-shaft limit the rotation of the first cross-shaft and the second cross-shaft to rotate approximately 90° relative to said output shaft.

9. The blade assembly for a windmill according to claim 1, and further including a cover housing operatively positioned to enclose said first cross-shaft and said second cross-shaft, a support housing disposed within said cover housing for mounting said first cross-shaft and said second cross-shaft in an operative arrangement for imparting rotation to said output shaft.

10. The blade assembly for a windmill according to claim 9, and further including a bearing operatively mounted relative to said cover housing for mounting said first cross-shaft and said second cross-shaft for limited rotation relative to said cover housing.

11. A blade assembly for a windmill comprising:
an first output shaft;
a first cross-shaft operatively mounted relative to said first output shaft, said first cross-shaft including a first end and a distal end;
a second cross-shaft operatively mounted relative to said first output shaft, said second cross-shaft including a first end and a distal end;
a first blade being mounted on said first end of said first cross-shaft, said first cross-shaft being rotated by said first blade to impart rotation to said first output shaft, a first stop being positioned on said first cross-shaft for limiting the rotation of said first cross-shaft relative to said first output shaft;
a second blade being mounted on said distal end of said first cross-shaft, said first cross-shaft being rotated by said second blade to impart rotation to said first output shaft, a second stop being positioned on said first cross-shaft for limiting the rotation of said first cross-shaft relative to said first output shaft;
a third blade being mounted on said first end of said second cross-shaft, said second cross-shaft being rotated by said third blade to impart rotation to said first outer shaft, a third stop being positioned on said second cross-shaft for limiting the rotation of said second cross-shaft relative to said first output shaft; and
a fourth blade being mounted on said distal end of said second cross-shaft, said second cross-shaft being rotated by said fourth blade to impart rotation to said first output shaft, a fourth stop being positioned on said second cross-shaft for limiting the rotation of said second cross-shaft relative to said first output shaft;
wherein said first blade is driven to impart a predetermined rotation to said first output shaft and thereafter said third blade is driven to impart a predetermined rotation to said first output shaft and thereafter said second blade is drive to impart a predetermined rotation to said first output shaft and thereafter said fourth blade is driven to impart a predetermined rotation to said first output shaft for providing continuous rotation to the first output shaft;
a second output shaft;
a third cross-shaft operatively mounted relative to said second output shaft, said third cross-shaft including a first end and a distal end;
a fourth cross-shaft operatively mounted relative to said second output shaft, said fourth cross-shaft including a first end and a distal end;
a fifth blade being mounted on said first end of said third cross-shaft, said fifth cross-shaft being rotated by said fifth blade to impart rotation to said second output shaft, a fifth stop being positioned on said third cross-shaft for limiting the rotation of said third cross-shaft relative to said second output shaft;
a sixth blade being mounted on said distal end of said third cross-shaft, said third cross-shaft being rotated by said sixth blade to impart rotation to said second output shaft, a sixth stop being positioned on said third cross-shaft for limiting the rotation of said third cross-shaft relative to said second output shaft;
a seventh blade being mounted on said first end of said fourth cross-shaft, said fourth cross-shaft being rotated by said seventh blade to impart rotation to said second output shaft, a seventh stop being positioned on said fourth cross-shaft for limiting the rotation of said fourth cross-shaft relative to said second output shaft; and
an eight blade being mounted on said distal end of said fourth cross-shaft, said fourth cross-shaft being rotated by said eight blade to impart rotation to said second output shaft, an eight stop being positioned on said fourth cross-shaft for limiting the rotation of said fourth cross-shaft relative to said second output shaft;
wherein said fifth blade is driven to impart a predetermined rotation to said second output shaft and thereafter said seventh blade is driven to impart a predetermined rotation to said second output shaft and thereafter said sixth blade is drive to impart a predetermined rotation to said second output shaft and thereafter said eight blade is driven to impart a predetermined rotation to said second output shaft for providing continuous rotation to the second output shaft.

12. The blade assembly for a windmill according to claim 11, wherein said fifth blade is disposed to be driven by wind when said sixth blade is rotated to be out of engagement with the wind and said seventh blade and said eight blade are arranged to be out of engagement with the wind.

13. The blade assembly for a windmill according to claim 11, wherein said seventh blade is disposed to be driven by wind when said eight blade is rotated to be out of engagement with the wind and said fifth blade and said sixth blade are arranged to be out of engagement with the wind.

14. The blade assembly for a windmill according to claim 11, wherein said sixth blade is disposed to be driven by wind when said fifth blade is rotated to be out of engagement with the wind and said seventh blade and said eight blade are arranged to be out of engagement with the wind.

15. The blade assembly for a windmill according to claim 11, wherein said eight blade is disposed to be driven by wind when said seventh blade is rotated to be out of engagement with the wind and said fifth blade and said sixth blade are arranged to be out of engagement with the wind.

16. The blade assembly for a windmill according to claim 11, wherein said first output shaft is rotated in an opposite direction relative to the direction of rotation of said second output shaft.

17. The blade assembly for a windmill according to claim 11, wherein a distal end of said first output shaft is operatively connected to a field magnet of a generator and a distal end of said second output shaft is operatively connected to an armature winding of the generator for generating electricity.

18. The blade assembly for a windmill according to claim 11, wherein said fifth stop and said sixth stop positioned on said third cross-shaft and said seventh stop and said eight stop fourth cross-shaft limit the rotation of the fourth cross-shaft and the eight cross-shaft to rotate approximately 90° relative to said second output shaft.

19. The blade assembly for a windmill according to claim 11, and further including a cover housing operatively positioned to enclose said third cross-shaft and said fourth cross-shaft, a support housing disposed within said cover housing for mounting said third cross-shaft and said fourth cross-shaft in an operative arrangement for imparting rotation to said second output shaft.

20. The blade assembly for a windmill according to claim 19, and further including a bearing operatively mounted relative to said cover housing for mounting said third cross-shaft and said fourth cross-shaft for limited rotation relative to said cover housing.

* * * * *